Patented July 4, 1944

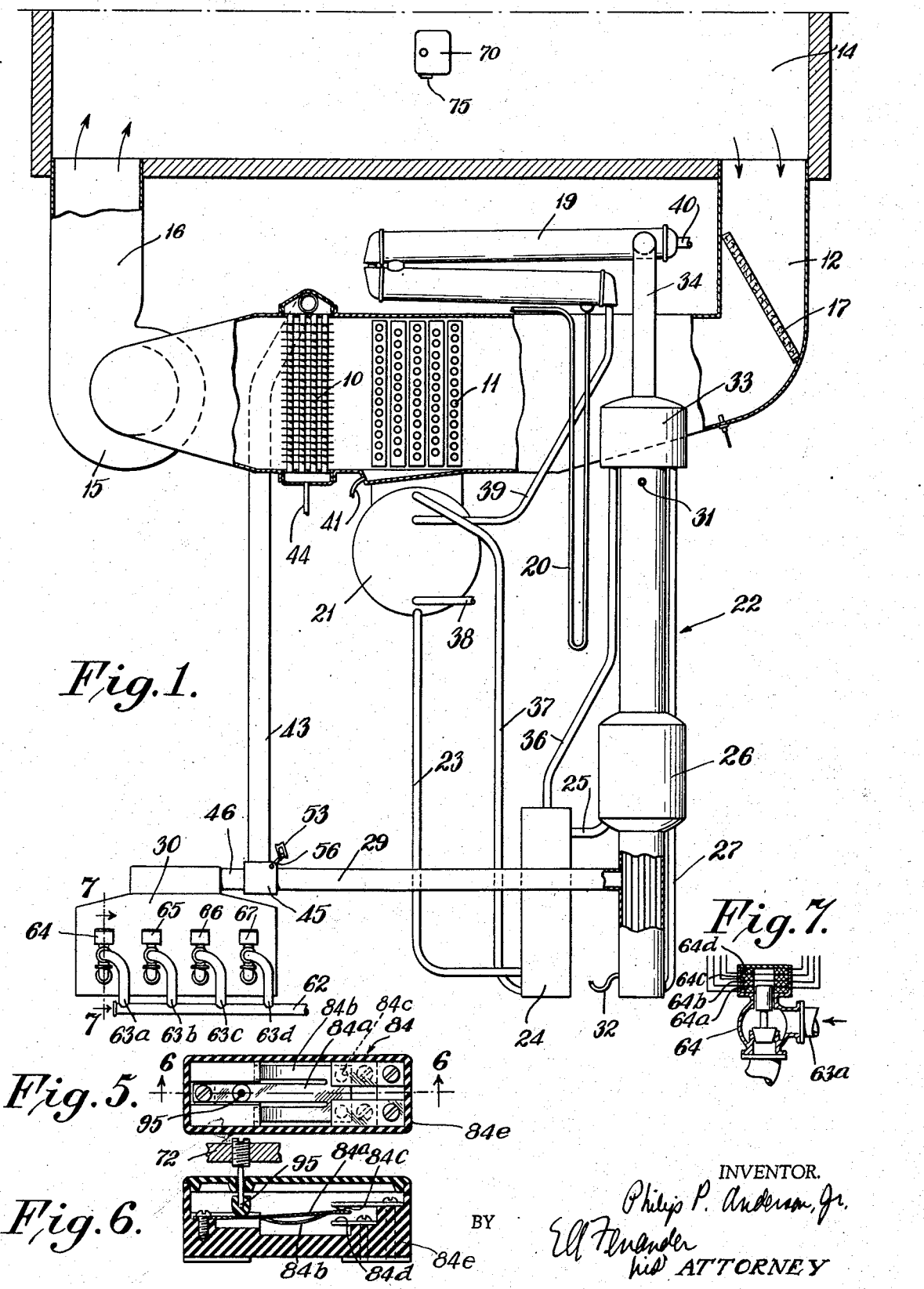

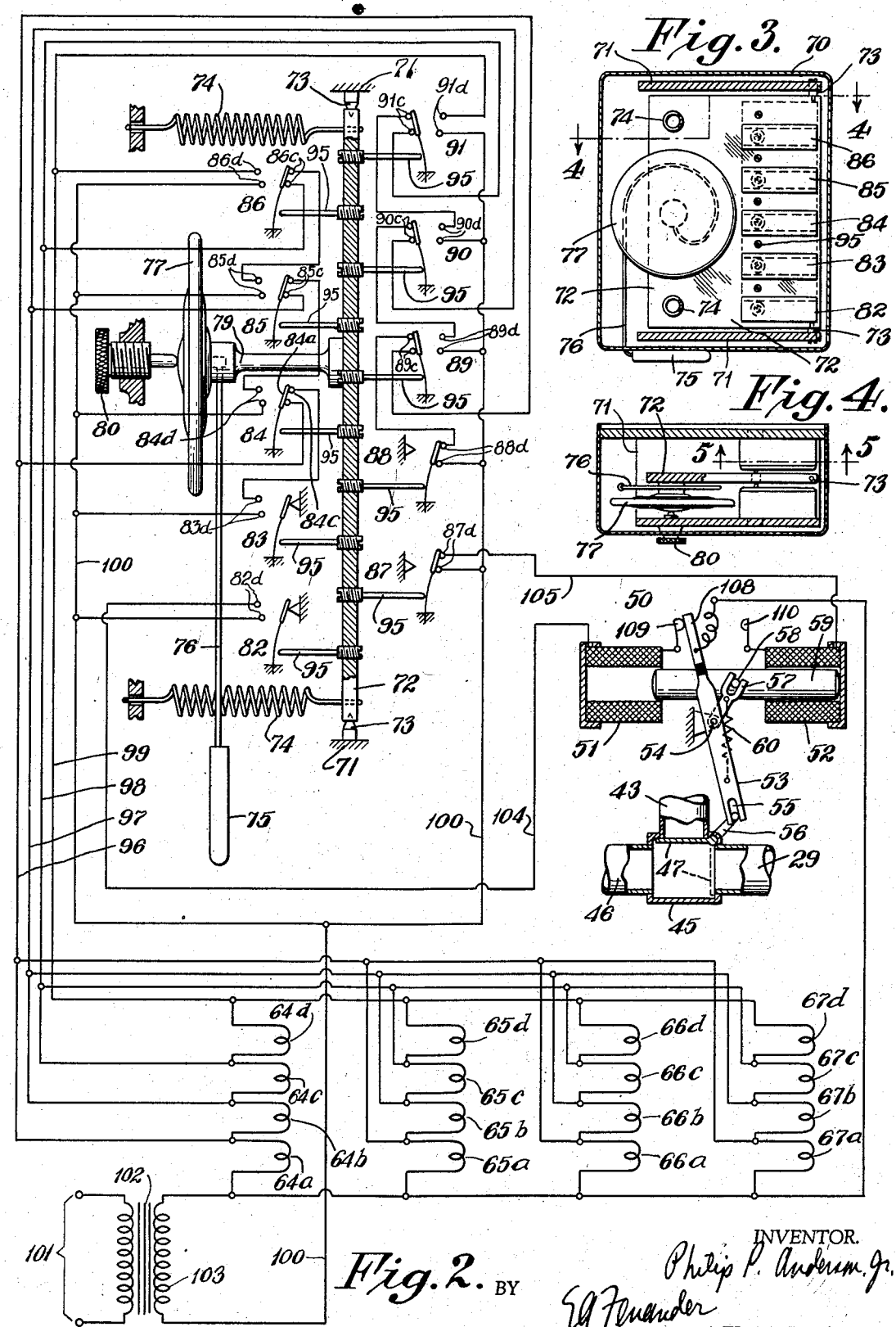

2,352,930

UNITED STATES PATENT OFFICE 2,352,930

AIR CONDITIONING

Philip P. Anderson, Jr., Evansville, Ind., assignor to Servel, Inc., New York, N. Y., a corporation of Delaware Application December 9, 1941, Serial No. 422,225

12 Claims. (Cl. 257—3)

This invention relates to air conditioning systems and has for its object to provide an improved automatic control which will enable such a system to maintain the proper temperature in a room or building throughout all seasons of the year.

Another object of the invention is to provide an air conditioning system of the above type containing both cooling and heating units, a common source of energy for both of said units, and a single control for initiating and regulating the operation of the respective units at the proper times.

Another more specific object of the invention is to provide an air circulating duct system connected with a room or other enclosure and containing a cooling unit and a heating unit which are both operated by heat from a common source of supply, in combination with a single thermostatic control device and means controlled thereby for automatically and selectively shifting the heat source into and out of association with the cooling unit and the heating unit as required, and for automatically regulating the supply of heat to whichever unit is in operation at a given time, thus insuring accurate control of temperature at all times with accompanying simplicity and economy of operation.

In the embodiment of the invention shown herein for purposes of illustration, a heating element such as a steam radiator, and a cooling element forming part of a heat-operated refrigerating unit, are arranged in an air-circulating duct system which is connected with the room or other enclosure to be conditioned. A boiler supplies steam to the radiator and to the generator of the refrigerating unit through conduits controlled by a two-position valve which is adapted to cut off the steam to one conduit while supplying the other. The boiler is heated by a burner or plurality of burners which are supplied with fuel through valves adapted to provide a variable fuel supply proportional to the openings therein. These valves, in turn, are operated by step-wise control members which open or close the valves in a plurality of steps in accordance with the temperature of the air in the room or enclosure to be conditioned.

The system includes a thermostatic control device which is responsive to changes in the temperature of the space to be conditioned. The control device includes a movable control member which is adapted to actuate, in sequence, a plurality of switches controlling the operation of the two-position valve in the steam line and the step-wise operation of the valves supplying fuel to the boiler. When the control member is in neutral position the valves in the fuel line are completely closed, cutting off the supply of fuel to the boiler, and in such case neither the heating element nor the cooling element in the duct system will function. However, when the temperature affecting the thermostatic control device varies from a predetermined desired value, the control member will operate, first to actuate the two-position valve in the steam line to admit steam either to the heating element or the cooling unit, as the case may be, and then to operate the valves in the fuel line in one or more steps to gradually increase or decrease the heating or cooling effect upon the air in the duct system. The operation of the system is entirely automatic and requires no maintenance or supervision.

The novel features which are believed to be characteristic of the invention are set forth with particularity in the claims. The invention, both as to organization and method, together with the above and other objects and advantages thereof, will be better understood by reference to the following description taken in connection with the accompanying drawings forming a part of this specification, and in which:

Fig. 1 is a view diagrammatically illustrating a heating and cooling system embodying the invention;

Fig. 2 is a diagrammatic view illustrating the electrical control circuit used in the system of Fig. 1;

Fig. 3 is a horizontal sectional view of a thermostatic control device which may be employed in the system of Fig. 1;

Fig. 4 is a vertical sectional view through the control device, taken on line 4—4 of Fig. 3;

Fig. 5 is a detail sectional view taken on line 5—5 of Fig. 4;

Fig. 6 is a detail sectional view taken on line 6—6 of Fig. 5; and

Fig. 7 is a vertical sectional view taken on line 7—7 of Fig. 1, illustrating the construction of the solenoid operated valves which control the fuel supply.

Referring to Fig. 1, the invention is shown in connection with a heating and cooling system comprising a heating element or radiator 10 and a cooling element 11 arranged in a duct system. The duct system includes a duct 12 through which air is withdrawn from the room or other enclosure 14 by a blower 15, the air being discharged by the blower into a duct 16 through which it is returned to the enclosure. The duct 12 may contain a suitable filter, shown as a pad 17. During operation of the heating unit or the cooling unit, as the case may be, heating or cooling effect is transmitted either by heating element 10 or cooling element 11 to air flowing through the duct system.

The cooling element 11 forms part of a refrigeration unit of a two-pressure absorption type and may be of the type described in application Serial No. 239,762 of A. R. Thomas and P. P. Anderson, Jr., filed November 10, 1938, now Patent No. 2,282,503, granted May 12, 1942. In a system of this type a liquid refrigerant such as, for example, water, is introduced into the upper part of cooling element 11 from a condenser 19 through a path of flow including a conduit 20. The liquid refrigerant evaporates in cooling element 11 with consequent absorption of heat to produce a refrigerating or cooling effect to cool the air passing through the duct system, as explained above.

The refrigerant vapor formed in cooling element 11 flows therefrom to absorber 21 in which the vapor is absorbed into a liquid absorbent such as, for example, lithium chloride solution. The absorption liquid, enriched in refrigerant, is conducted from absorber 21 to generator 22 through a path of flow including a conduit 23, a first passage in liquid heat exchanger 24, a conduit 25, a vessel 26 and conduit 27. Within generator 22 are disposed a plurality of riser tubes enveloped by a chamber formed by the outer shell to which steam is supplied through a conduit 29 from a boiler 30. The chamber formed by the outer shell of the generator 22 provides for full length heating of the riser tubes, a vent 31 being provided at the top part of the outer shell. A trap conduit 32 is connected to the bottom part of the outer shell to provide a drain for condensate formed in the generator 22.

The heating of the riser tubes by the steam causes refrigerant vapor to be expelled from the absorbent, the expelled vapor being effective to raise liquid absorbent by gas or vapor-lift action. The expelled vapor passes from the upper ends of the riser tubes into a vapor separator 33 and thence flows through a conduit 34 to condenser 19 in which the vapor is liquefied. The liquid refrigerant formed in condenser 19 flows to the upper part of cooling element 11, as explained above, to complete the refrigerating cycle.

The raised absorption liquid from which refrigerant vapor has been expelled is conducted from the upper part of generator 22 to absorber 21 to absorb refrigerant vapor, this liquid being conducted to the absorber in a path of flow including a conduit 36, a second passage in liquid heat exchanger 24, and conduit 37, which is connected to the upper part of the absorber.

The condenser 19 and absorber 21 constitute heat rejecting parts of the refrigeration unit and are cooled by a suitable cooling medium, such as, for example, water, which is conducted from a suitable source of supply through a conduit 38 to a bank of tubes within the absorber whereby heat, resulting from absorption of refrigerant vapor by liquid absorbent, is given up to the cooling water. The water is conducted from absorber 21 through a conduit 39 to condenser 19 in which heat of condensation, resulting from condensation of refrigerant vapor, is given up to the cooling water. The cooling water leaves the condenser 19 through a conduit 40. In the embodiment illustrated, a liquid trap having a drain pipe 41 is provided in the duct system beneath cooling element 11. In order to simplify the drawings the parts of the refrigeration unit have not been shown in detail, such an illustration of the parts not being necessary for an understanding of this invention. The disclosure in the aforementioned Thomas and Anderson application may be considered as being incorporated in this application, and, if desired, reference may be made thereto for a detailed description of the refrigeration unit.

The steam radiator 10 in the duct system is connected to the boiler 30 by a conduit 43. The radiator may be provided with a liquid trap and a drain pipe 44. As explained above, when the air in the room or enclosure 14 is below the desired temperature, heat is supplied to the radiator 10; and when the air in the room or enclosure 14 is above the desired temperature, the air is cooled by means of the cooling element 11. We shall now describe the mechanisms employed for accomplishing this result, whereby the room may be maintained at any desired regulated temperature, without manual operation or supervision of any kind.

The conduit 29 which connects generator 22 to boiler 30, and the conduit 43 which connects steam radiator 10 to said boiler 30, are both coupled to a two-way valve 45 which, in turn, is connected to boiler 30 by means of pipe 46 as shown in Figs. 1 and 2. The valve 45 contains a two-position steam valve flapper 47, which is shown in detail in Fig. 2. In the position illustrated, valve flapper 47 is closing conduit 43, shutting off the supply of steam to radiator 10 while permitting steam to flow through conduit 29 to the generator of the refrigerating unit. However, valve flapper 47 may be moved about its pivot, as hereinafter described, to shut off the flow of steam to conduit 29, and in such case steam will flow from boiler 30 through pipe 46 and conduit 43 to the radiator 10.

Valve flapper 47 is actuated by a double, snap-action solenoid 50 having a pair of windings 51 and 52 as shown in Fig. 2. A lever 53 which is pivoted to the framework at 54, has its lower end forked at 55 and engaging an arm 56 which is fixed to the pivoted steam valve flapper 47. A toggle member 57 is likewise pivoted upon the pivot 54 and has its upper end forked to engage a pin 58 on the core 59 of solenoid 50. A spring 60 connects toggle member 57 to the lower end of lever 53, so that, when the solenoid core 59 is moved either to the left or right as viewed in Fig. 2, the lever 53 will be moved by a snap action to throw the valve flapper 47 about its pivot to open one steam pipe and close the other, according to the direction of movement.

The steam boiler 30 is arranged to be heated by a plurality of gas burners or banks of burners which, in the embodiment illustrated, are four in number. A combustible gas is delivered to the burners through a conduit 62 from a suitable source of supply. The gas flows to the burners or banks of burners through branch pipes 63a, 63b, 63c and 63d, the flow of gas to the respective burners or banks being controlled by individual stepwise solenoid operated valves 64, 65, 66 and 67 which are of the type having an opening proportional to the movement of the valve stem. These solenoid valves are alike in construction, and, in the embodiment illustrated, the coil of each solenoid valve is tapped at three points to provide four sections. Thus, as illustrated in Figs. 2 and 7, the coil of the solenoid valve 64 is tapped to provide coil sections 64a, 64b, 64c and 64d. The coils of the other solenoid valves 65, 66 and 67 are similarly tapped as illustrated in Fig. 2. The purpose of this construction is to operate the compound solenoids in such a way as to variably open the valves to provide a variable fuel supply proportional to the valve openings. One or more sections of each coil, starting at the bottom, may be energized in a manner hereinafter described, with the result that the associated valves will open to a corresponding extent.

The snap-action solenoid 50 and the solenoid valves 64 to 67 inclusive are operated by a control device 70. As diagrammatically shown in Fig. 1, the control device 70 is located in the room or enclosure 14 so that it is capable of effecting the control of the various solenoids in response to the temperature of the air in said room or enclosure.

As shown in Figs. 2 to 4, the control device 70 includes a pair of brackets 71 to which a plate 72 is pivoted at 73. The plate 72, which will be referred to as a swinging or hinged door, is normally spring-biased toward the left, as viewed in Fig. 2, by means of springs 74.

An expansible fluid thermostat which operates in response to temperature conditions of the air in enclosure 14, is employed to cause the door or plate 72 to swing outwardly against the action of coil springs 74. The expansible fluid thermostat may be of the type disclosed more in detail in an application of S. W. E. Andersson, Serial No. 406,778, filed August 14, 1941, which includes a thermal bulb 75 located at the bottom of control device 70. The thermal bulb 75 is connected by a capillary tube 76 to an expansible and contractible bellows 77 of any suitable construction. The bellows 77 is secured to the plate or door 72 by a post 79. On its opposite side, the bellows 77 bears against an adjustable screw 80 as shown in Figs. 2 and 4. It will thus be evident that expansion of the bellows 77 in response to an increase in temperature in room 14 will cause the door 72 to swing outwardly against the action of coil springs 74, while contraction of the bellows in response to a drop in temperature within room 14 will cause the said door 72 to swing in the opposite direction under the action of said springs.

On one side of the swinging door 72 there are a plurality of switches 82 to 86, while on the opposite side of said door there are a similar number of switches 87 to 91. These switches are adapted to be actuated in sequence by pins 95, which are adjustably mounted on the door 72, as best illustrated in Figs. 2 and 6. The switches 82 to 91 may be of a well-known micro-switch type adapted to be actuated by a relatively short movement of the pins 95. One of these switches, for example, the switch 84, is shown in detail in Figs. 5 and 6 as comprising a blade 84a which is spring pressed by means of a spring 84b against back contacts 84c and is adapted to be flexed downwardly by pin 95 to break the contacts 84c and to make front contacts 84d. The blade 84a and the spring 84b are shown in Fig. 5 as formed integrally and the entire switch mechanism is enclosed in a housing 84e. It is to be understood, however, that the details of construction may be varied as desired and that a specific switch has been shown merely for purposes of illustration.

Switches 84, 85, 86, 89, 90 and 91 are of the type above described having front contacts 84d, 85d, etc., and back contacts 84c, 85c, etc. Switches 82, 83, 87 and 88 are similar except that the back contacts are omitted and suitable stops are provided in place thereof. The switches 82 to 86 on one side of the door 72 control the operation of the heating element 10 in the duct system; while the switches 87 to 91 on the opposite side of the door, control the operation of the cooling element 11 in the duct system. The pins 95 are suitably adjusted to cause the switches 82 to 86 to operate in sequence in response to movement of the plate 72 to the left (Fig. 2), and the switches 87 to 91 to operate in sequence in response to movement of the plate 72 to the right from its normal center position corresponding to correct room temperature.

Referring to the wiring diagram of Fig. 2, it will be noted that the sections $a$, $b$, $c$ and $d$ of the respective solenoids 64, 65, 66 and 67 are connected in parallel to lines 96, 97, 98 and 99 respectively. The line 96 is connected through the back contacts 84c and 89c of the switches 84 and 89 to the front contacts 83d and 88d respectively of switches 83 and 88 and thence to a return line 100. The line 97 is connected through the back contact 85c and 90c of the switches 85 and 90 to the front contacts 84d and 89d of the switches 84 and 89 respectively and thence to the return line 100. The line 98 is connected through the back contacts 86c and 91c of switches 86 and 91 to the front contacts 85d and 90d of the switches 85 and 90 respectively and thence to the return line 100. The line 99 is connected to the front contacts 86d and 91d of switches 86 and 91 respectively and thence to the return line 100. Power for operating the solenoids 64 to 67 is supplied from a main 101 through a transformer 102, a secondary 103 of which is connected between the solenoids 64 to 67 and the return line 100.

The contacts 82d and 87d of the switches 82 and 87 are connected respectively by lines 104 and 105 to windings 51 and 52 of the double acting solenoid 50 and to the return line 100. The return line from the solenoid 50 is connected to the secondary 103 so that the windings 51 and 52 are selectively energized in accordance with the actuation of the switches 82 and 87.

With the parts of the system in the positions illustrated in Fig. 2, it will be noted that the solenoid valve 45 in the steam line has closed the conduit 43 leading to the steam radiator 10, and opened the conduit 29 leading to the generator 22 of the refrigerating unit, permitting steam to flow from the boiler 30 through the conduit 29 to said generator, so that in this position of the parts the cooling element 11 is in operation, provided the gas burners are operating.

As previously explained, the valves 64, 65, etc., controlling the gas burners which heat the boiler 30, give a variable supply of fuel proportional to the openings in said valves, and the extent to which said valves are open depends upon the number of coil sections of the solenoids which are energized at any given time. When the parts are in the position shown in Fig. 2, for example, only the first or lowermost windings 64a, 65a, 66a and 67a of the valve solenoids are energized, the energizing circuit extending from one side of the secondary 103, through the solenoid coil sections 64a, 65a, etc., line 96, back contacts 89c of switch 89, front contacts 88d of switch 88 and return line 100 to the other side of secondary 103.

Now if the cooling effect produced by the cooling element 11, under the above conditions, is still insufficient, the air in the enclosure 14 becomes warmer, with the result that the bellows 77 will expand still further, thereby forcing the door 72 to swing further upon its pivots 73 until the pin 95 controlling switch 89 causes said switch to open its back contacts 89c and close its front contacts 89d. When this happens, the coil sections a and b of the coils 64 to 67 will be energized in series over a circuit extending from one side of the secondary 103 of transformer 102, through coil sections a and b in series, line 97, back contacts 90c of switch 90, front contacts 89d of switch 89 and return line 100 to the other side of the secondary 103. It will be noted that when switch 89 operates in this manner to close its front contacts, it will at the same time open its back contacts and thus break the previously described energizing circuit of the lowermost coil sections 64a, 65a, etc., since, if this were not done, the coil sections 64b, 65b, etc., would be short circuited.

With the energization of the first two coil sections of each valve solenoid, the opening of each valve in the gas line is increased, thereby increasing the supply of fuel to the burners and correspondingly increasing the cooling effect of the cooling element 11. In a similar manner, if the amount of refrigeration is still insufficient, the air in room 14 will become warmer, thus causing further movement of the swinging door 72 in a direction to actuate switch 90, and subsequently, if necessary, to actuate switch 91, to cause progressive energization of the third coil section and finally the fourth coil section of each of the valve solenoids, thereby further increasing the fuel supply and further increasing the cooling effect of the cooling element 11.

When the temperature of the air in the room or enclosure 14 decreases, the effect upon thermostatic control device 70 is such as to move the swinging door 72 in a direction opposite to that described above. That is, the bellows 77 contracts and, therefore, causes the door 72 to swing toward the left as viewed in Fig. 2, the extent of movement depending upon the drop in temperature affecting control device 70, to progressively open the front contacts of switches 91 to 86 in the reverse order, thereby progressively deenergizing the coil sections d, c, b and a of the valve solenoids 64, 65, etc., and progressively closing the fuel supply until the valves are completely closed.

If, when this condition prevails, the temperature of the air in the room or enclosure 14 is still below the desired temperature to which thermostatic control device 70 has been set, the bellows 77 of the control device will continue to contract and cause further movement of swinging door 72 to the left in Fig. 2 to bring about the operation of steam radiator 10 in the duct system. First, switch 87 opens its front contacts, and switch 82 closes its front contacts, thereby energizing the winding 51 of snap-action solenoid 50 over a circuit extending from one side of the secondary 103 of transformer 102 through a contact strip 108 on solenoid lever 53, contact 109 thereof, winding 51, line 104, switch 82 and return line 100 to the other side of secondary 103. The solenoid winding 51 thereupon attracts armature 59, instantly shifting the snap-action valve flapper 47 to close conduit 29 leading to the generator of the refrigerating system and open conduit 43 which connects the pipe 46 of furnace 30 with the steam radiator 10. This operation of solenoid 50 likewise causes the contact strip 108 of lever 53 to disengage contact 109 and causes said contact strip 108 to engage contact 110 so that subsequent energization of solenoid winding 52 can be accomplished if and when switch 87 is again closed to return the valve 45 to the "refrigerating" position previously described.

Continued swinging of the door 72 in the "heating" direction, or to the left as viewed in Fig. 2, causes switch 83 to close its front contacts, thus energizing the lowermost coil sections 64a, 65a, 66a and 67a of the solenoid valves 64, 65, etc., over a circuit extending from one side of the secondary 103, through coil sections 64a, 65a, etc., line 96, back contacts 84c of switch 84 and front contacts 83d of switch 83 and return line 100 to the other side of secondary 103. Energization of the lowermost coil sections 64a, 65a, etc., of the solenoid valves causes the valves to open to the corresponding extent, whereupon the gas flowing to the burners is ignited by the usual pilot light, the resulting steam from boiler 30 flowing through conduit 43 to radiator 10 in the duct system.

If the heat produced by radiator 10 is not sufficient, the room or enclosure 14 becomes cooler, and the swinging door 72 of control device 70 is drawn further to the left as viewed in Fig. 2 to progressively close switches 84, 85 and 86, thereby progressively energizing the second, third and fourth coil sections b, c and d of the respective solenoid valves 64 to 67 in a manner similar to that described above with respect to switches 89, 90 and 91, thus increasing as needed the flow of steam to radiator 10.

It is to be noted that the single control unit 70 serves to control the supply of steam either to the radiator or to the cooling unit and to vary the amount of steam in accordance with the heat requirements. The supply of steam is gradually increased as the temperature either rises or falls from a predetermined point. By controlling the gas burners directly the steam is only produced as needed and is supplied to the selected unit in the necessary quantities to produce the desired heating or cooling effect.

Although a single embodiment of the invention has been shown and described for purposes of illustration, it will be apparent to those skilled in the art that various modifications and changes may be made without departing from the scope and spirit of the invention as defined in the appended claims.

The invention claimed is:

1. An air conditioning system comprising a heat-operated heating unit and a heat-operated cooling unit adapted, respectively, for heating and cooling a space to be conditioned, a source of heat adapted to be selectively connected to said heating and cooling units, a variably operable means controlling the intensity of said heat source, a thermostatic control, said thermostatic control including a movable control member and only a single thermal element for actuating said control member responsive to changes in the temperture of the space to be conditioned, mechanism operated by movement of said control member for selectively connecting said heat source to said heating and cooling units according to the direction of temperature change, and apparatus also operated by movement of said control member for actuating said variably operable means to vary the intensity of said heat source in accordance with the magnitude of said temperature change, said control member always having movement through distances functionally related to changes in temperature.

2. An air conditioning system comprising a heat-operated heating unit and a heat-operated cooling unit adapted, respectively, for heating and cooling a space to be conditioned, a source of heat and means for selectively connecting same to said heating and cooling units, a variably operable valve controlling the intensity of said heat source, a compound solenoid controlling said variably operable valve and including a plurality of coil sections adapted to be energized in sequence to variably operate said valve, a thermostatic control including only a single thermal element responsive to changes in the temperature of the space to be conditioned, mechanism operated by said control for selectively connecting said heat source to said heating and cooling units according to the direction of temperature change, and apparatus also operated by said control for energizing the respective coil sections of said solenoid in sequence to regulate the intensity of said heat source.

3. An air conditioning system comprising a steam-operated heating unit and a steam-operated cooling unit adapted, respectively, for heating and cooling a space to be conditioned, a source of steam and a steam valve for selectively connecting same to said heating and cooling units, a variably operable valve controlling the supply of steam from said source, a compound solenoid controlling said variably operable valve and including a plurality of coil sections adapted to be energized in sequence to variably operate said valve, a thermostatic control including only a single thermal element responsive to changes in the temperature of the space to be conditioned, mechanism operated by said control for actuating said steam valve according to the direction of temperature change, and apparatus also operated by said control for subsequently energizing the respective coil sections of said valve solenoid in sequence to variably operate the associated valve in accordance with the temperature of the space to be conditioned.

4. An air conditioning system comprising a steam-operated heating unit and a steam-operated cooling unit adapted, respectively, for heating and cooling a space to be conditioned, means including a steam boiler and a pair of conduits connecting same to said heating and cooling units for supplying steam thereto, a two-position steam valve between said boiler and said conduits for selectively controlling the admission of steam to said conduits, a variably operable valve controlling the supply of fuel to said boiler in amounts proportional to the valve opening, a compound solenoid controlling said fuel supply valve and including a plurality of coil sections adapted to be energized in sequence to variably operate said valve, a thermostatic control including only a single thermal element responsive to changes in the temperature of the space to be conditioned, mechanism operated by said control for actuating said steam valve according to the direction of temperature change, and apparatus also operated by said control for subsequently energizing the respective coil sections of said valve solenoid in sequence to variably operate said fuel supply valve in accordance with the temperature of the space to be conditioned.

5. An air conditioning system comprising a steam-operated heating unit and a steam-operated cooling unit adapted, respectively, for heating and cooling a space to be conditioned, means including a steam boiler and a pair of conduits connecting same to said heating and cooling units for supplying steam thereto, a two-position steam valve between said boiler and said conduits for selectively controlling the admission of steam to said conduits, a plurality of variably operable valves controlling the supply of fuel to said boiler in amounts proportional to the valve openings, compound solenoids controlling said fuel supply valves and including a plurality of coil sections adapted to be energized in sequence to variably operate said valves, a thermostatic control including only a single thermal element responsive to changes in the temperature of the space to be conditioned, mechanism operated by said control for actuating said steam valve according to the direction of temperature change, and apparatus also operated by said control for subsequently energizing the respective coil sections of said valve solenoids in sequence to variably operate said fuel supply valves in accordance with the temperature of the space to be conditioned.

6. An air conditioning system comprising a steam-operated heating unit and a steam-operated cooling unit adapted, respectively, for heating and cooling a space to be conditioned, means including a steam boiler and a pair of conduits connecting same to said heating and cooling units for supplying steam thereto, a two-position steam valve between said boiler and said conduits, a plurality of step-wise valves controlling the supply of fuel to said boiler in amounts proportional to the valve openings, compound solenoids controlling said fuel supply valves and including a plurality of coil sections adapted to be energized in sequence to variably operate said valves, a thermostatic control responsive to changes in the temperature of the space to be conditioned and including only a single thermal element and a pivoted control member movable in either of two directions according to the direction of temperature change, means controlled by said member for actuating said steam valve to selectively control the admission of steam to said conduits, and means controlled by said member for energizing the respective coil sections of said valve solenoids in sequence to variably operate said fuel supply valves in accordance with the temperature of the space to be conditioned.

7. An air conditioning system comprising a heating unit and a heat-operated cooling unit adapted, respectively, for heating and cooling a space to be conditioned, a boiler providing a source of steam, a burner for heating said boiler, means to supply steam from said boiler to either of said units, means controlling the quantity of fuel supplied to said burner, and thermostatic means including only a single thermal element connected to actuate said steam supply means and also operate said fuel control means in a manner to increase in definite increments to the rate of supply of fuel to said burners as the temperature affecting said thermostatic means varies in either direction from a predetermined value.

8. An air conditioning system comprising a heating unit and a cooling unit adapted, respectively, for heating and cooling a space to be conditioned, a thermostat including a movable control member responsive to changes in temperature of the space to be conditioned, a first set of contacts successively closed by movement of said control member as the ambient temperature increases from a predetermined value, a second additional set of contacts successively closed by movement of said control member as the ambient temperature decreases from said predetermined value, said control member always having movement through distances functionally related to changes in temperature, means controlled by the closing of the first contacts of each of said said sets by movement of said control member to render said cooling unit or said heating unit selectively operative, and means controlled by the closing of the remaining contacts of each of said sets by movement of said control member to progressively increase the heating or cooling effect of said units.

9. An air conditioning system comprising a steam-operated heating unit and a steam-operated cooling unit adapted, respectively, for heating and cooling a space to be conditioned, a source of steam and a steam valve for selectively connecting same to said heating and cooling units, valve means for controlling the supply of steam from said source, a thermostat including a movable control member responsive to changes in temperature of the space to be conditioned, a first set of contacts successively closed by movement of said control member as the ambient temperature increases from a predetermined value, a second additional set of contacts successively closed by movement of said control member as the ambient temperature decreases from said predetermined value, said control member always having movement through distances functionally related to changes in temperature, means controlled by the closing of the first contacts of each of said sets by movement of said control member to actuate said steam valve to supply steam to a selected unit, and means controlled by the closing of the remaining contacts of each of said sets by movement of said control member to control said valve means so as to progressively increase the supply of steam to the selected unit.

10. An air conditioning system comprising a heating unit and a heat-operated cooling unit adapted, respectively, for heating and cooling a space to be conditioned, a source of steam including a burner operated furnace, selective means to supply steam from the source to either of said units, means controlling the quantity of fuel supplied to said burner, a thermostat responsive to changes in temperature of the space to be conditioned, a set of contacts successively closed by said thermostat as the ambient temperature increases from a predetermined value, a second additional set of contacts successively closed by said thermostat as the ambient temperature decreases from said predetermined value, means controlled by the closing of the first contacts of each of said sets to actuate said selective means, and means controlled by the closing of the remaining contacts of each of said sets to control said fuel control means so as to progressively increase the fuel supply as the temperature varies from said predetermined value in either direction.

11. An air conditioning system comprising a heat-operated heating unit and a heat-operated cooling unit for heating and cooling a space to be conditioned, a source of heat, first solenoid-operated valve means for selectively connecting the source of heat either to said heating unit or to said cooling unit, second solenoid-operated valve means for controlling the intensity of said heating source, structure providing a thermostatic control including only a single thermal element responsive to changes in the temperature of the space to be conditioned, electrical conductors connecting said structure and said first and second solenoid-operated valve means, said structure containing mechanism operated by said control to render said first solenoid-operated valve means operable to connect said heat source either to said heating unit or to said cooling unit according to the direction of temperature change from a given point, said structure also containing apparatus operated by said control to actuate said second solenoid-operated valve means to vary the intensity of said heat source in accordance with the magnitude of said temperature change, all parts of said mechanism and said apparatus forming a part of said structure to provide a single compact unit positioned in the space to be conditioned and connected by said electrical conductors to said first and second solenoid-operated valve means.

12. An air conditioning system comprising a heating unit and a heat operated cooling unit for heating and cooling a space to be conditioned, a boiler providing a source of steam, a burner for operating said boiler, first solenoid-operated valve means for controlling flow of steam from said boiler either to said heating unit or to said cooling unit, second solenoid-operated valve means for regulating the rate at which fuel is supplied to said burner and hence the rate at which steam is produced in said boiler, structure providing a thermostatic control including only a single thermal element responsive to changes in the temperature of the space to be conditioned, electrical conductors connecting said structure and said first and second solenoid-operated valve means, said structure containing mechanism operated by said control to render said first solenoid-operated valve means operable to cause flow of steam from said boiler either to said cooling unit or to said heating unit according to the direction of temperature change from a given point, said structure also containing apparatus operated by said control to actuate said second solenoid-operated valve means for controlling flow of fuel to said burner and hence the rate at which steam is produced by the latter in accordance with the magnitude of said temperature change, all parts of said mechanism and said apparatus forming a part of said structure to provide a single compact unit positioned in the space to be conditioned and connected by said electrical conductors to said first and second solenoid-operated valve means.

PHILIP P. ANDERSON, JR.